United States Patent [19]

DiMatteo

[11] 4,003,027
[45] Jan. 11, 1977

[54] ARRANGEMENT FOR VARYING THE RATE OF RECORDING OF INFORMATION

[75] Inventor: Paul L. DiMatteo, Huntington, N.Y.
[73] Assignee: Dynell Electronics Corporation, Melville, N.Y.
[22] Filed: Oct. 4, 1974
[21] Appl. No.: 512,081
[52] U.S. Cl. .......................................... 340/172.5
[51] Int. Cl.² .......................................... G06F 5/06
[58] Field of Search .............. 360/8, 18; 346/33 R, 346/33 M; 340/172.5

[56] References Cited
UNITED STATES PATENTS

| | | | |
|---|---|---|---|
| 3,020,525 | 2/1962 | Garrison et al. | 340/172.5 |
| 3,221,334 | 11/1965 | Jones | 346/33 M |
| 3,426,339 | 2/1969 | Rich et al. | 360/8 |
| 3,686,436 | 8/1972 | Camras | 360/18 |
| 3,775,568 | 11/1973 | Hino et al. | 360/8 |
| 3,831,192 | 8/1974 | Gross et al. | 360/8 |
| 3,878,560 | 4/1975 | Ramage | 360/8 |

*Primary Examiner*—Mark E. Nusbaum
*Attorney, Agent, or Firm*—Max Fogiel

[57] ABSTRACT

An arrangement in which a high-frequency signal to be recorded, is quantized, and the respective analog signal voltages at the quantized interval are recorded upon a memory drum. The quantized analog signals are read from the drum, during predetermined time intervals, and transferred into at least two storage registers. The storage registers receive the analog signal information in an alternating manner, and the registers read out the information alternatingly for recording the information on a medium at a speed which is substantially different from the recording speed onto the drum.

17 Claims, 4 Drawing Figures

ARRANGEMENT FOR VARYING THE RATE OF RECORDING OF INFORMATION

BACKGROUND OF THE INVENTION

In the recording of high frequency signals onto media such as a photographic glass plate, for example, it is important to carry out the recording process at a speed which is substantially less than the speed of recording which is possible onto magnetic tape. Thus, the high recording speed which may be observed when recording on magnetic tape, is not feasible if a high frequency signal is to be reproduced or recorded faithfully on various other media. Whereas apparatus is known in the art for changing recording speeds, such apparatus has been complex in construction and not particularly adaptable for the purpose of changing the recording speed to allow accurate recording of information in analog form, onto media requiring a substantially low recording speed to enable the signal to be recorded or reproduced without significant loss of information content.

It has not been feasible to reduce the speed of recording information onto preselected media, be reducing the rate at which information is read out from magnetic tape, for example, since a reduction in the surface speed of the tape results in degradation of the signal.

Accordingly it is an object of the present invention to provide an arrangement to reduce the speed of recording information on preselected media, with respect to the speed at which the information is supplied.

Another object of the present invention is to provide an arrangement of the foregoing character which is adapted to recording information containing high frequency signal components.

A further object of the present invention is to provide an arrangement, as described, which is simple in design and construction, and highly reliable in service.

SUMMARY OF THE INVENTION

The objects of the present invention are achieved by providing an arrangement in which the signal to be recorded is quantized at predetermined intervals, and the respective analog voltages corresponding to the predetermined intervals, are recorded upon a magnetic drum. In recording the quantized signal onto the drum, each quantized interval is identified on the drum, together with its corresponding analog voltage or value of the signal at the respective interval. The quantized values are, thereafter, read out from the drum, during predetermined periods of time, and transferred alternatingly, in at least two registers or memory circuits. The speed of recording the information on the drum, as well as reading out from the drum, is at a substantially high speed corresponding to that applicable for recording and playback of a magnetic drum or tape.

The information is read out from the storage registers or memory circuits, at a speed which is substantially less than the speed at which the information was entered into the registers. The information is, furthermore, read out of the registers in an alternating manner, and recorded subsequently onto a medium requiring a correspondingly reduced recording speed. The arrangement is such that when information is alternatingly read out from one register, new information is entered onto the other register.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
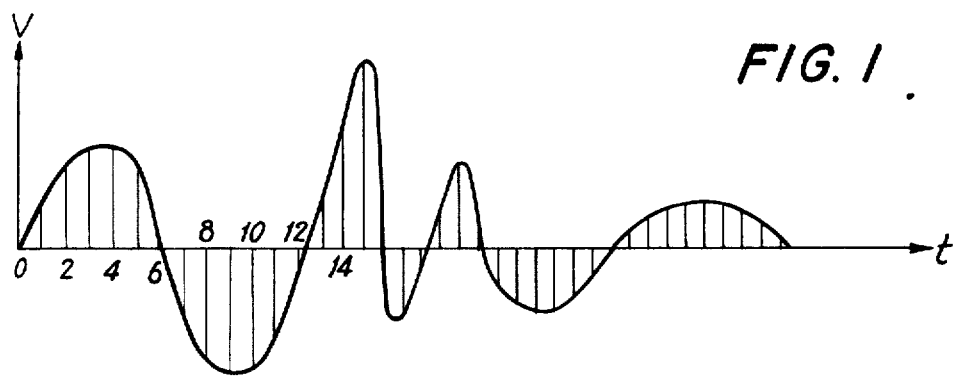
FIG. 1 is a graphical representation of a typical signal to be recorded onto a medium at a speed which is substantially less than the speed of reading out the signal from another medium, in accordance with the present invention.

Referring to the drawing and in particular to FIG. 1, there is shown the waveform of a typical signal to be finally recorded on a medium such as glass, for example. The signal 10 may contain high frequency components which are to be faithfully reproduced. The signal 10 is quantized at intervals 1, 2, 3, 4 . . . which are taken sufficiently small to enable the signal to be reproduced and recorded with sufficient accuracy. The greater the accuracy to be obtained, the smaller becomes the interval for quantizing the signal.

Figure 2:
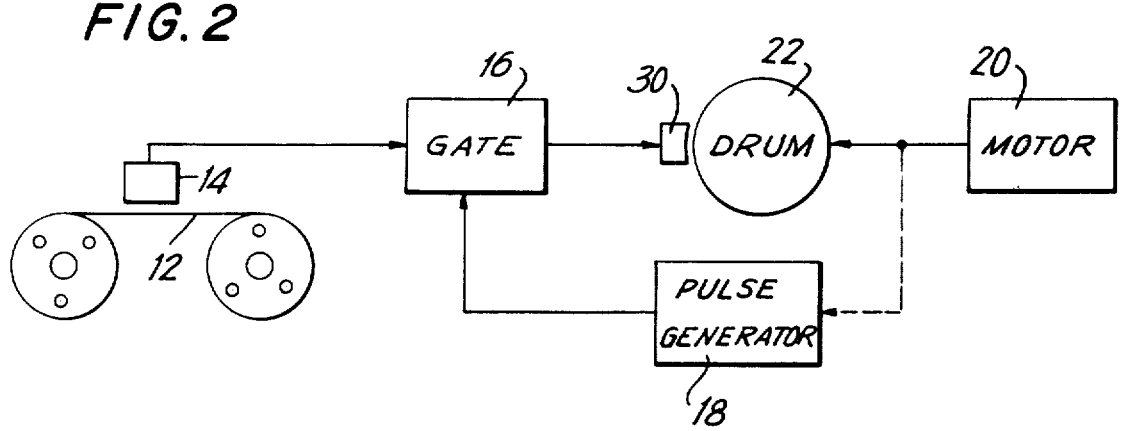
FIG. 2 is a schematic diagram and shows the apparatus for quantizing the signal of FIG. 1 and recording the quantized values onto a magnetic drum.

The signal 10 can be quantized and the respective analog values at the quantized intervals may be recorded on a drum, in accordance with the arrangement of FIG. 2. Prior to being quantized, the signal 10 is recorded, for example, on magnetic tape 12 which is moved past a read or playback head 14. The signal read from the tape 12 is applied to a gate 16 controlled by a pulse generator 18. The latter is driven by means of the rotational drive 20 in the form, for example, a synchronous motor 20. This motor 20 also drives the magnetic drum 22. Since the motor 20 drives both the pulse generator 18 and the drum 22, the pulse generator is driven synchronously with the drum.

Figure 3:
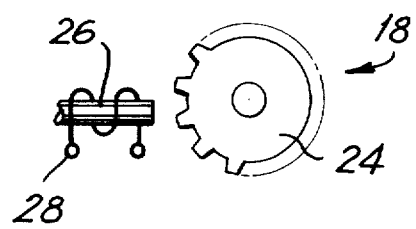
FIG. 3 is a schematic diagram of a pulse generator used in conjunction with the apparatus of FIG. 2.
Figure 4:
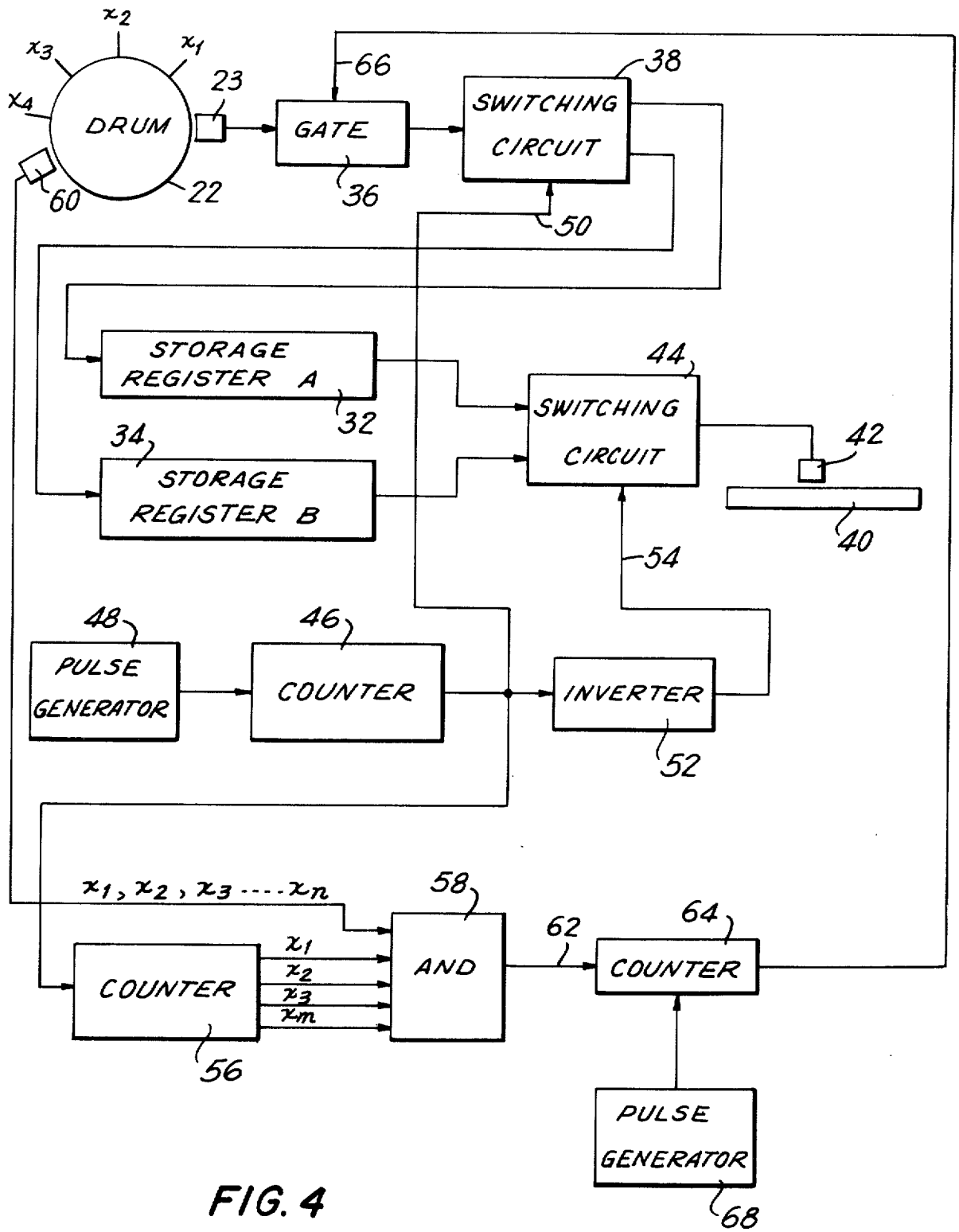
FIG. 4 is a schematic diagram and shows the arrangement for reading out the quantized values on the magnetic drum for recording on a predetermined medium at a reduced recording speed, in accordance with the present invention.

The pulse generator 18 may be constructed in the form of, for example, the embodiment shown in FIG. 3. In this design, a toothed wheel member 24 is rotated in accordance with the rotation of the drum 22, by being geared, for example, to the motor 20 which is also geared to the drum 22. The toothed wheel 24 is rotated in the path of a magnetic coil 26 with the rotation of the wheel 24, a pulse becomes generated by the coil 26, as a result of the change in the magnetic reluctance as the teeth on the wheel 24 pass by the coil 26. The pulses from the coil 26 appear at the terminals 28. The construction of a pulse generator in accordance with the preceding description is well known in the art and is, for this reason, not further described here.

The pulses emitted by the pulse generator 18 serve to control the gate 16 so that the signal from the playback head 14 is transmitted or passed by the gate 16, during the duration of the pulse. Thus, whenever a pulse is applied to the gate 16 by the generator 18, the gate 16 transmits the signal from the playback head 14 for recording onto the drum 22 by means of the recording head 30. The spacing between pulses applied to the gate 16 corresponds to the spacing of the intervals in which the signal 10 is to be quantized. Furthermore, the duration of the pulses for controlling the gate 16, is selected substantially narrow in width so as to be well within the quantizing interval.

The gate 16 is a linear gate which transmits the analog signal from the playback head 14, whenever a pulse is applied to the gate by the generator 18. During the pulse duration, therefore, the corresponding analog voltage of the signal at the instant that the pulse appears, is transmitted by the gate 16 and recorded onto the drum 22 by means of the recording head 30. Each analog voltage recorded on the drum 22 is identified with its respective interval, since the pulse generator 18 is directly linked to the drive for the drum 22. It is not essential that the pulse generator 18 be constructed in the form of the embodiment of FIG. 3. It is possible, in accordance with the present invention to simply record pulses directly onto the drum 22, and read these pulses out from the drum and apply them for controlling the gate 16, upon driving the drum with the motor 20. It may be seen from such an arrangement of recording the pulses directly on the drum 22, that the drum may be subdivided into intervals corresponding to the intervals in which the signal 10 is to be quantized, furthermore, each such interval can be coded in binary form, for example, to specify each interval uniquely.

The recording of the quantized values of the signal 10 upon the drum 22, is carried out at a recording speed which allows the speed of tape 12 to attain the value of which an accurate read out of the signal by the playback head 14 is obtained.

The quantized signals recorded on the drum 22 are subsequently read out from the drum and entered alternatingly into storage registers 32 and 34, by way of gate 36 and a switching circuit 38. The information contained in the storage registers 32 and 34 is alternatingly read out from these two registers and recorded onto a medium 40 as, for example a photographic glass plate which requires a substantially reduced recording speed. A recording head 42 used for recording the quantized signals onto the medium or plate 40, receives the signal information from the storage registers 32 and 34, by way of the switching circuit 44. The switching circuit 38 serves to enter the information from the drum 22 into the storage registers 32 and 34, in an alternating manner. At the same time, the switching circuit 44 serves to read out the information from the two storage registers 32, 34 alternatingly. Thus, after the information held in storage register 32 has been received by the recording head 42, the switching circuit 44 disconnects storage register 32 from the head 42, and connects thereupon the storage register 34 with the head 42. Accordingly, the switching circuit 44 is functionally similar to a single pole, double throw switch which connects the head 42 alternatingly to the storage registers 32 and 34. For purposes of convenient identification, the storage unit 32 is designated as register A, and the second storage unit 34 is designated as register B.

The switching circuit 38 is similar to the element 44, in the respect that this switching circuit 38 connects the output of gate 36 in an alternating manner to the inputs of the storage registers 32 and 34. Both switching circuits 38 and 44 perform the switching functions electronically, in a manner well known in the art. Thus, such switching circuits may be found in the textbook "Digital Computers" by R. K. Richards, D. VanNostrand Company 1955, pages 39–47.

To maintain continuity of recording onto the medium 40, the information in storage register 32, for example, is first passed through the switching circuit 44 and applied to the recording head 42. When the contents of the register 32 have been fully recorded onto the medium 40, the switching circuit 44 switches to the second register 34, and continues the transfer of information onto the recording medium 40 until the contents of register 34 have been completely transferred from that register. The switching circuit 44, thereupon, disconnects the register 34 from the head 42 and connects this head back to register 32. At the same time, when the register 34 is connected to the recording head 42 by the switching circuit 44, the register 32 is connected to the read head 23 of the drum 22, through the switching circuit 38. Accordingly, while information is being read out from the register 34 and recorded onto the medium 40, information is read into the register 32 from the drum 22. With this arrengement, therefore, information is taken from the drum 22 and recorded in a continuous manner on the medium 40. At the same time, the recording speed by the head 42 is substantially less than the speed of reading out information from the drum 22 by means of the head 23. These storage registers 32 and 34 serve as the means for compensating between the differences in the recording speed on the medium 40 and the read out speed from the drum 22. The read out speed of the drum 22 must be carried out at substantially the relatively higher speed, corresponding to the surface speed of the tape 12, in order to retain the information content of the signal 10, and therefore provide for substantial accuracy in reproducing and recording this signal.

The storage registers 32 and 34 retain a predetermined number of analog voltages corresponding to the quantized intervals. Thus, assuming that the signal 10 is to be subdivided into $n$ quantized intervals, and the corresponding analog voltage for each respective interval is to be stored for the $n$ intervals, then the registers 32 and 34 are comprised each of $n$ stages. For purposes of storing the analog signals within the registers, these registers may be constructed of R-C (resistor-capacitance) networks used conventionally for storing analog voltages. In conjunction therewith, it is to be noted that the n intervals may correspond only to a portion of the signal 10.

The time interval required for transferring the contents from either one of the registers 32 and 34, is determined by a counter 46 having $n$ stages. With a capacity of $n$ counts, the counter 46 resets and completes a cycle whenever the $n$ stages of the registers 32, 34 have been transferred out and recorded onto the medium 40. The counter 46 is actuated by pulses from a pulse generator 48. The latter provides pulses at spaced intervals so as to assure that when $n$ pulses have been applied to the counter 46, the contents of either one of the registers 32, 34 have been completely read out and recorded onto the medium 40. When the counter 46 has thus completed a cycle, the counter output applies a signal to the control input 50 of the switching circuit 38. The application of this signal on the control input 50, causes the switching circuit to change state, so that the entering of information from the drum 22 changes between the registers 32, 34. The output of the counter 46, applies, simultaneously, a signal also to the switching circuit 44 through the inverter 52. The signal applied to the control input of the switching circuit 44 causes this circuit to also reverse state and alternate the read out from the registers 32, 34.

When the register 32 is connected, through switching circuit 38 to the drum read out head 23, this register 32 is not connected, through the switching circuit 44, to the recording head 42. While, at this time, the register 34 is connected by the switching circuit 44 to the recording head 42, this register 34 is not connected by the switching circuit 38 to the read or playback head 23 of the drum 22. Accordingly, the switching circuits 38 and 44 operate in opposite phase in relation to the registers 32 and 34, and for this reason an inverter 52 is provided so that the identically constructed switching circuits 38, 44 are operated in opposite phase.

In general, the $n$ stages of the registers 32, 34 will correspond to information or quantized intervals for only a section or portion of the signal 10. Thus, numerous alternating interchanges of entering information into the registers 32, 34 may be required before the signal 10 shown in FIG. 1, for example, is fully recorded onto the medium 40. Under such conditions, the drum 22 may be subdivided, for example, into sections $x_1, x_2, x_3$... with each such section corresponding to n quantized intervals capable of being stored by the registers 32, 34. With the subdivision of the signal 10 and drum 22 into such sections or portions $x_1, x_2, x_3$..., the drum 22 may rotate many times, for example, while one of the registers 32, 34 is being read out onto the medium 40. Furthermore, the quantized analog voltages for a typical section recorded on the drum 22, for example, will be entered into either one of the registers 32, 34 at a substantially higher speed than being read out from the registers and applied to the recording head 42. For this reason, it is essential that provision be made to retain in memory the sections which have been entered into the registers, and those sections which remain to be entered for recording onto the medium 40. This memory of the sections processed, is provided a signal for each one of the sections in which the waveform 10 is subdivided. Each output of the counter 56 is uniquely coded to correspond to the respective one of the sections of the waveform 10 and drum 22. Such unique coding of outputs of the counter 56 may, for example, be achieved through binary coding or other conventional coding well known in the art.

The outputs of the counter 56 are applied to an AND-gate 58. This gate 58 receives also an input from a read out head 60 of the drum 22. The head 60 serves to read out the sections $x_1, x_2, x_3$..., as they rotate past the head. Assuming that section $x_2$ has been completed, for example, and that the quantized analog voltages corresponding to section $x_3$ are to be entered into the registers 32, 34, then the uniquely coded output $x_3$ of the counter 56 is applied to the gate 58. This gate 58 will then provide an output only when the section $x_3$ recorded on the drum 22 passes the head 60. At that instant the gate 58 applies a "start" signal to the control input of the counter 64. This counter 64 applies, in turn, at that instant a control signal to the control input 66 of the gate 36. With the application of this control signal to the gate 36, the latter allows the passage of signal information from the head 23 to the switching circuit 38.

The counter 64 has a count capacity corresponding to the number of quantized intervals within a section or portion of the waveform 10, i.e., the number of intervals within a section $x_1, x_2, x_3$.... The counter 64 is advanced by pulsed from a generator 68, and when the number of quantized intervals within a section have been read out by the head 23, the counter 64 resets and the gate 36 ceases to transmit signal information from the head 23 to the switching circuit 38. Since the transmission of information from the drum 22 is carried out at a substantially high speed, the spacing of pulses from the generator 68 is provided to result in a corresponding high speed actuation of the counter 64. Accordingly, the spacing of pulses for actuating the counter 64 corresponds substantially to the spacing of the pulses emitted by the generator 18 for controlling the gate 16. Consequently, pulses for actuating the counter 64 may be derived directly from the pulse generator 18, and the unit 68 may be omitted when this is advantageous. The pulse generators 48 and 68 may be in the form of the device 18. Detailed descriptions of pulse generators may also be found in the textbook "Pulse and Digital Circuits" by Millman and Taub, McGraw Hill Company 1956, pages 272–284, and 302–307. Counters 56 and 64 are conventional devices which may also be found in this same textbook on pages 323–353. The coding arrangement of counter 64 is described on page 330 and 343.

In accordance with another embodiment of the present invention, the quantized analog voltages derived from the signal 10, are digitized and recorded onto the medium 40 in digitally-coded form. Such digitizing of the quantized analog voltages may be achieved by conventional analog-to-digital converters well known in the art and commercially available. The registers 32 and 34 become correspondingly digital memory means which may be comprised of, for example, binary stages such as flip flops. In this embodiment, furthermore, the digitized quantized values are also recorded in digital form onto the drum 22.

Whereas only two storage registers 32 and 34 are illustrated in the drawing, it is possible to extend the number of storage registers to greater than the two shown, depending on the relative recording speeds for the drum 22 and medium 40. It is also not essential that the signal to be recorded on the medium 40 be derived from means such as the magnetic tape 12. It is feasible, instead that the signal applied to the gate 16 for recording onto the drum 22, be derived directly from a radio-frequency signal received by an antenna, for example, so that the radio-frequency signal is processed in real time.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for changing the recording speed of a signal from a first speed to a second speed comprising the steps of: subdividing said signal into predetermined intervals by recording values of said signal at the ends of said intervals, said values corresponding to the ordinates of the signal when said signal is graphically represented on a system of coordinate axes; recording at a first speed the values of said signal at the ends of said intervals; sensing said recorded values at a speed substantially equal to said first speed; storing in a first storage means a first portion of said sensed values; storing in at least a second storage means a second portion of said values; recording at a second speed substantially different from said first speed the first portion of said values; stored in said first storage means; and alternately recording at said second speed the second stored portion of said values stored in said second storage means; said first and second portions of said values being stored and alternately recorded separately to allow said portions to be stored at said first speed prior to when said portions may be received and recorded at said second speed when said second speed is substantially different from said first speed, one of said stored portions being recorded at said second speed while the other one of said portions is being stored at said first speed.

2. The method as defined in claim 1, including the step of grouping said sensed values alternatingly into first and second portions.

3. The method as defined in claim 1, including the step of converting said signal to an analog signal, said respective values of said signal at said intervals being analog values.

4. The method as defined in claim 1, including the step of setting said second speed substantially less than said first speed.

5. The method as defined in claim 1, includng the step of digitizing said respective values of said signal at said intervals.

6. The method as defined in claim 1, including the step of recording said respective values of said signal at said intervals on magnetic storage means.

7. The method as defined in claim 1, including the step of grouping said sensed values alternatingly into first and second portions, converting said signal to an analog signal, said respective values of said signal at said intervals being analog values, setting said second speed substantially less than said first speed, digitizing said respective values of said signal at said intervals, and recording said respective values of said signal at said intervals on magnetic storage means.

8. An arrangement for changing the recording speed of a signal from a first speed to a second speed comprising, in combination, means for subdividing said signal into predetermined intervals by recording values of said signal at the ends of said intervals, said values corresponding to the ordinates of the signal when said signal is graphically represented on a system of coordinate axes; first recording means for recording at a first speed the values of said signal at the ends of said intervals; means for sensing said recorded values at said first speed; first and second storage means connected alternatingly to said sensing means for receiving alternatingly at least first and second portions of said sensed values; storage switching means for connecting alternatingly said first and second storage means to said sensing means; and second recording means connected alternatingly to said first and second storage means for recording alternatingly said first and second portions of said sensed values onto a predetermined medium at a second speed substantially different from said first speed; said first and second portions of said values being stored and recorded separately to allow said portions to be stored at said first speed prior to when said portions may be received and recorded at said second speed when said second speed is substantially different from said first speed, one of said stored portions being recorded at said second speed while the other one of said portions is being stored at said first speed.

9. The arrangement as defined in claim 8 wherein said means for recording at a first speed the respective values of said signal at said intervals comprises magnetic storage means.

10. The arrangement as defined in claim 9 including pulse generator means operating synchronously with said magnetic storage means for subdividing said signal into said predetermined intervals, and recording the respective values of said signal at said intervals.

11. The arrangement as defined in claim 8 wherein said storage switching means comprises further first switching means connected to the inputs of said first and second storage means; and second switching means connected to the outputs of said first and second storage means.

12. The arrangement as defined in claim 8, wherein said second speed is substantially less than said first speed.

13. The arrangement as defined in claim 8, wherein said signal comprises an analog signal.

14. The arrangement as defined in claim 13, including means for digitizing said respective values of said signal at said intervals.

15. The arrangement as defined in claim 8 including pulse generator means operating synchronously with said magnetic storage means for subdividing said signal into said predetermined intervals, and recording the respective values of said signal at said intervals, said means for recording at a first speed the respective values of said signal at said intervals comprising magnetic storage means; said storage switching means comprising further first switching means connected to the inputs of said first and second storage means, and second switching means connected to the outputs of said first and second storage means; timing means connected to said first and second switching means for alternatingly switching from said first to said second storage means after predetermined time durations; gating means between said sensing means and said first switching means; and auxiliary timing means connected to said gating means for passing said sensed values to said first switching means in groups of said intervals of said signal, said second speed being substantially less than said first speed, and signal comprises an analog signal; and means for digitizing said respective values of said signal at said intervals.

16. An arrangement for changing the recording speed of a signal from a first speed to a second speed comprising, in combination, means for subdividing said signal into predetermined intervals by recording values of said signal at the ends of said intervals, said values corresponding to the ordinates of the signal when said signal is graphically represented on a system of coordinate axes; first recording means for recording at a first speed the values of said signal at the ends of said intervals; means for sensing said recorded values at said first speed; first and second storage means connected alternatingly to said sensing means for receiving alternatingly at least first and second portions of said sensed values; storage switching means for connecting alternatingly said first and second storage means to said sensing means; second recording means connected alternatingly to said first and second storage means for recording alternatingly said first and second portions of said sensed values onto a predetermined medium at a second speed substantially different from said first speed, said first and second portions of said values being stored and recorded separately to allow said portions to be stored at said first speed prior to when said portions may be received and recorded at said second speed when said second speed is substantially different from said first speed, one of said stored portions being recorded at said second speed while the other one of said portions is being stored at said first speed, said storage switching means comprising further first switching means connected to the inputs of said first and second storage means, and second switching means connected to the outputs of said first and second storage means; and timing means connected to said first and second switching means for alternatingly switching from said first to said second storage means after predetermined time durations.

17. The arrangement as defined in claim 16 including gating means between said sensing means and said first switching means; and auxiliary timing means connected to said gating means for passing said sensed values to said first switching means in groups of said intervals of said signal.

* * * * *